(12) United States Patent
Kitahara

(10) Patent No.: US 8,280,534 B2
(45) Date of Patent: Oct. 2, 2012

(54) CONTROL AND MONITORING SYSTEM

(75) Inventor: Hideki Kitahara, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 695 days.

(21) Appl. No.: 12/478,348

(22) Filed: Jun. 4, 2009

(65) Prior Publication Data

US 2009/0309721 A1    Dec. 17, 2009

(30) Foreign Application Priority Data

Jun. 17, 2008 (JP) .................. 2008-158405

(51) Int. Cl.
*G06F 11/32* (2006.01)
(52) U.S. Cl. ............... 700/83; 700/12; 700/16; 700/17; 700/108; 702/182; 702/187; 715/775; 340/3.7
(58) Field of Classification Search ............... 700/83, 700/169, 108, 12, 15, 17; 715/771, 772, 715/839, 965, 970, 977; 702/183, 185, 187; 340/3.1, 3.3, 3.43, 3.44, 506, 517–525
See application file for complete search history.

(56) References Cited

U.S. PATENT DOCUMENTS

| | | | | |
|---|---|---|---|---|
| 4,635,183 A * | 1/1987 | Isobe et al. | ....................... | 700/12 |
| 5,414,809 A * | 5/1995 | Hogan et al. | ................... | 715/765 |
| 6,259,956 B1 * | 7/2001 | Myers et al. | ..................... | 700/80 |
| 6,901,560 B1 * | 5/2005 | Guerlain et al. | ............... | 715/833 |
| 6,925,423 B2 * | 8/2005 | Fukube et al. | ................ | 702/187 |
| 7,634,384 B2 * | 12/2009 | Eryurek et al. | ............... | 702/182 |
| 7,698,686 B2 * | 4/2010 | Carroll et al. | ................. | 717/125 |
| 2005/0027858 A1 * | 2/2005 | Sloth et al. | ..................... | 709/224 |
| 2006/0149412 A1 * | 7/2006 | Fujishima et al. | ............ | 700/169 |
| 2007/0239291 A1 * | 10/2007 | Wayland et al. | ................ | 700/83 |

FOREIGN PATENT DOCUMENTS

| | | |
|---|---|---|
| JP | 58-029012 A | 2/1983 |
| JP | 2002-373021 A | 12/2002 |

* cited by examiner

*Primary Examiner* — George Bugg
*Assistant Examiner* — Anne Lai
(74) *Attorney, Agent, or Firm* — Buchanan Ingersoll & Rooney PC

(57) ABSTRACT

When a system operator selects a message to be analyzed from among a plurality of messages listed in a state change list displayed on an HMI unit, a monitoring target is identified from the selected message and all other messages that correspond to the same monitoring target are automatically searched. Subsequently, a timeline chart is displayed that represents changes in the operating state specified in the selected message and the found messages.

11 Claims, 9 Drawing Sheets

FIG.6

| STATE CHANGE LIST | | | | |
|---|---|---|---|---|
| No. | DATE AND TIME | | CONTENTS | STATE |
| 110 | 11/12/2007 | 13:13:15.135 | xx LINE 1L 44S-3 | OPERATED |
| 111 | 11/12/2007 | 13:13:15.145 | xx LINE 2L 44S-3 | OPERATED |
| 112 | 11/12/2007 | 13:13:15.150 | xx LINE 1L DC-EARTH | FAIL |
| 113 | 11/12/2007 | 13:13:15.200 | xx LINE 1L CB | OPEN |
| 114 | 11/12/2007 | 13:13:15.225 | xx LINE 2L CB | OPEN |
| 115 | 11/12/2007 | 13:13:15.235 | xx LINE 1L 44S-3 | RESET |
| 116 | 11/12/2007 | 13:13:15.245 | xx LINE 2L 44S-3 | RESET |
| 117 | 11/13/2007 | 13:13:15.300 | xx LINE 1L DC-EARTH | RESET |

CHART-PAGE DISPLAY

FIG.8

STATE CHANGE LIST ~201

| No. | DATE AND TIME | | CONTENTS | STATE |
|---|---|---|---|---|
| | 203 | 204 | 205 | |
| 110 | 11/12/2007 | 13:13:15.135 | xx LINE 1L 44S-3 | OPERATED |
| 111 | 11/12/2007 | 13:13:15.145 | xx LINE 2L 44S-3 | OPERATED |
| 112 | 11/12/2007 | 13:13:15.150 | xx LINE 1L DC-EARTH | FAIL |
| 113 | 11/12/2007 | 13:13:15.200 | xx LINE 1L CB | OPEN |
| 114 | 11/12/2007 | 13:13:15.225 | xx LINE 2L CB | OPEN |
| 115 | 11/12/2007 | 13:13:15.235 | xx LINE 1L 44S-3 | RESET |
| 116 | 11/12/2007 | 13:13:15.245 | xx LINE 2L 44S-3 | RESET |
| 117 | 11/13/2007 | 13:13:15.300 | xx LINE 1L DC-EARTH | RESET |

206, 207, 209 CHART-PAGE DISPLAY, 202, 208a, 208n

CONTROL AND MONITORING SYSTEM

BACKGROUND OF THE INVENTION

1. Field of the Invention

The present invention relates to a control and monitoring system installed in a plant and the like having a monitoring target such as a substation.

2. Description of the Related Art

Typically, a control and monitoring system is arranged to constantly monitor the operating state of key equipments, which are determined to be monitoring targets, inside, e.g., a substation that is necessary in maintaining a stable power supply. The monitoring result of the control and monitoring system provides information such as occurrence of a malfunction state or recovery from a malfunction state to a system operator and record. The history of such monitoring results can be used for maintenance and repair of the monitoring targets or for statistical analysis. Moreover, the significance of performing constant monitoring is to enable the system operator to immediately take necessary actions in case a monitoring target falls in a malfunction state. That helps in minimizing the possible adverse effect on other equipments. Thus, it is important that the control and monitoring system promptly notifies the system operator of any malfunctioning monitoring target and provide correct details of the malfunction state.

In response to the detection of a malfunction state of a monitoring target, a conventional control and monitoring system obtains malfunction state contact information from the monitoring target, compares the amount of current or the amount of voltage output by the monitoring target with internal predetermined values, and, if the values do not match, issues a warning to the system operator. Moreover, the control and monitoring system includes a human-machine interface (HMI) unit on which changes in the operating state of the monitoring target are displayed in the form of changes in particular symbols and the details of those changes are listed as textual messages. That enables the system operator to learn about the malfunction state of the monitoring target.

The control and monitoring system records information about changes in the operating state of the monitoring targets (e.g., falling in a malfunction state or recovering from a malfunction state). The recorded information includes textual messages providing the date and time at which the changes occurred and the identification information of the monitoring targets in which the changes occurred along with the changed operating states (malfunction state or recovered state) of the identified monitoring targets. The control and monitoring system stores the recorded information or displays the recorded information on the HMI unit.

For example, Japanese Patent Application Laid-open No. S58-29012 discloses a malfunction displaying technique for displaying a malfunction state of a plant. Similarly, Japanese Patent Application Laid-open No. 2002-373021 discloses a warning displaying technique for displaying the results of monitoring the operating state of a plant.

As described above, in a conventional control and monitoring system, information about changes in the operating state of the monitoring targets is recorded as textual messages that provide the date and time at which the changes occurred and the identification information of the monitoring targets in which the changes occurred along with the changed operating states (malfunction state or recovered state) of the identified monitoring targets. The recorded information is stored or displayed as a message list on the HMI unit. In case a monitoring target accidentally falls in a malfunction state, the recorded information is used to analyze the cause of the accident. For that, the system operator has to search the message list for the message that indicates malfunctioning of the particular monitoring target, the time at which the message was generated, and any other messages that provide details of previous changes in the operating state of the same monitoring target. However, usually, an accident causes changes in the operating state of more than one monitoring targets. Moreover, the list includes messages corresponding to a plurality of monitoring targets, some of which may not get affected by the accident. Thus, the task of searching messages that provide details of the monitoring targets affected by the accident is not easy.

Moreover, the information provided by the messages is textual information and the messages are displayed as a list on the HMI unit to provide as much information to the system operator as possible. Thus, recognizing the messages by the corresponding character string (textual information) and searching for desired messages from the list consumes a lot of time. Furthermore, in a stressful emergency situation at the time of an accident, there is a risk that relevant messages are overlooked during the search or a character string is falsely recognized as a similar but different character string.

Meanwhile, a waveform recording device is also used for monitoring an electric power equipment. The waveform recording device performs rapid recording of current waveforms or voltage waveforms at periodic sampling timings. However, due to the limitations in physical storage capacity, it is necessary to specify in advance the signals to be recorded and the triggers to be used for storing the recorded signals. Moreover, it is also necessary to record various combinations of signals in response to the possibility of a plurality of malfunctions. Furthermore, because a waveform recording device displays all specified signals, the displayed signals include signals that are not necessary for analysis at that particular point of time thereby making the analysis job complicated.

In Japanese Patent Application Laid-open No. S58-29012, a method to perform trend display within a predetermined time period or starting from an arbitrary time instant is described by operating a display switching unit (see FIG. 5 in Japanese Patent Application Laid-open No. S58-29012). However, because the display switching unit and an HMI unit used to display warning messages are arranged in a mutually isolated manner, the displayed information lacks in coherency. Moreover, because the system operator is required to perform operations while comparing apparently similar textual information displayed in the list of warnings, there is a risk of errors occurring during normal operations. Furthermore, the trend display within a predetermined time period cannot be considered as the suitable display format because the displayed information may include information that the system operator does not require at that particular point of time.

In Japanese Patent Application Laid-open No. 2002-373021, description is given regarding a warning displaying device that displays a warning history page including the history of warnings (see FIG. 24 in Japanese Patent Application Laid-open No. 2002-373021). However, there is no description about displaying only those warning messages that are required by the system operator. That is, because the warning messages are displayed by obtaining information from a history table (see paragraph no. 119 in Japanese Patent Application Laid-open No. 2002-373021), the displayed warning messages includes information not required by the system operator at that point of time. Meanwhile, a warning storage unit includes a target warning specifying unit that is used to arbitrarily specify and store current warnings and a displaying unit is used to display the stored information (see paragraph no. 39 in Japanese Patent Application Laid-open No. 2002-373021). However, that process involves two steps, namely, a step of storing warnings and a step of selecting warnings for display. Moreover, the operations for carrying out those steps are not described in detail.

In this way, in a conventional monitoring system, the detailed information about changes in the operating state of monitoring targets is displayed in the form of a list of textual messages. The display of a list of textual messages is suitable for efficiently providing as much information as possible at once to the system operator. However, because the necessary details are displayed only in the form of textual messages, it is difficult to get an idea about the temporal sequence of changes in the operating state of a particular monitoring target. Moreover, although it is possible to display the textual messages in chronological order, it still does not serve the purpose of displaying only the required information in an easy and correct manner and in a short amount of time.

SUMMARY OF THE INVENTION

It is an object of the present invention to at least partially solve the problems in the conventional technology.

According to one aspect of the present invention, there is provided a control and monitoring system including a processing unit that obtains an operating state signal from at least one monitoring target, detects a change in operating state of the monitoring target based on the operating state signal, creates a state change list in which the change in operating state of the at monitoring target is listed in form of a text message including at least one of identification information for identifying the monitoring target and date-time information about date and time at which the change in operating state occurred in the monitoring target, as well as operating state information, and outputs a control signal to the monitoring target according to detected change in operating state; and a human machine interface unit that includes a display unit that displays thereon the state change list. When a message is selected from the state change list displayed on the display unit, the processing unit searches the state change list for a message that includes identification information identical to identification information included in selected message, and displays a chart page that includes a timeline chart representing a temporal sequence of changes in operating state of the monitoring target identified in the selected message based on the selected message and searched message.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram of a list page that is displayed on the HMI unit and that is used to instruct display of a chart page including a timeline chart;

FIG. 8 is a schematic diagram of a list page that is displayed on an HMI unit of a control and monitoring system according to a second embodiment of the present invention and that is used to instruct display of a chart page including timeline charts.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
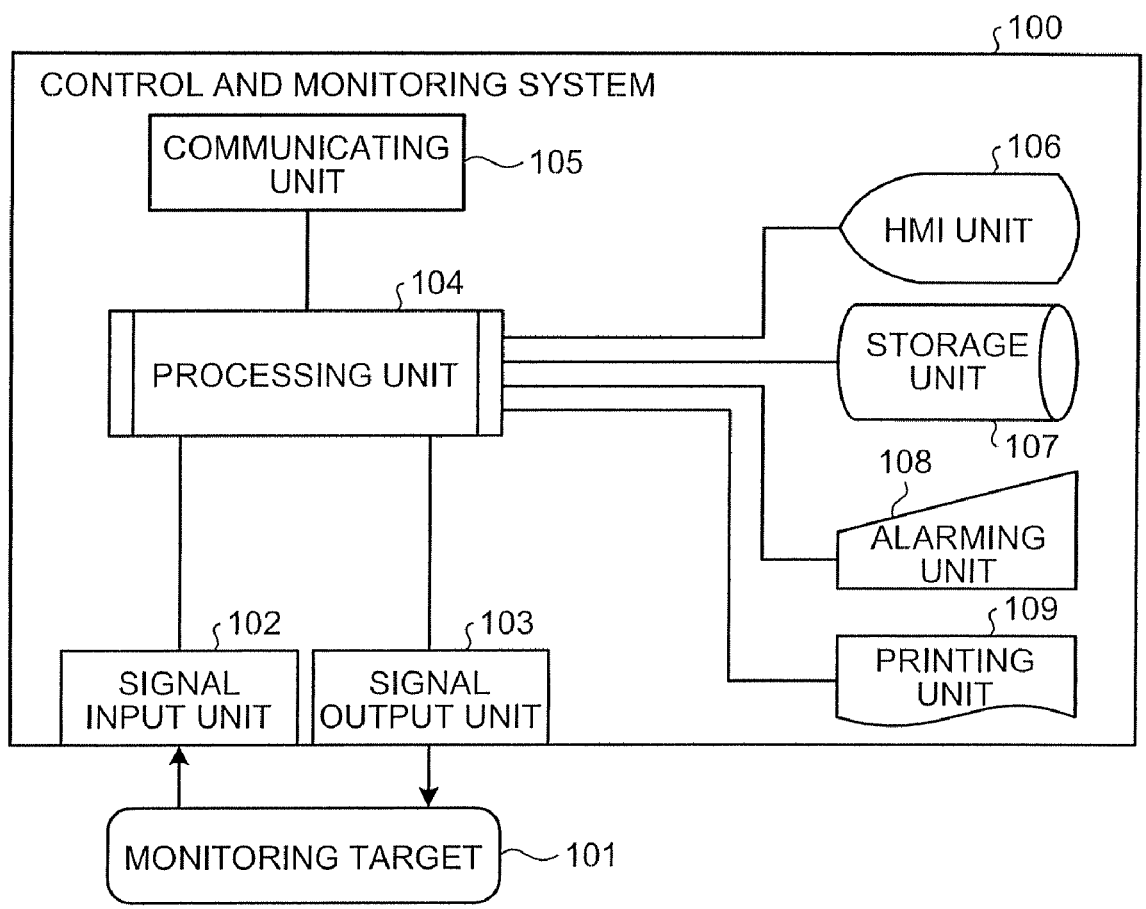
FIG. 1 is a block diagram of a control and monitoring system according to a first embodiment of the present invention.

FIG. 1 is a block diagram of a control and monitoring system 100 according to a first embodiment of the present invention. The control and monitoring system 100 includes a signal input unit 102, a signal output unit 103, a processing unit 104, a communicating unit 105, an HMI unit 106, a storage unit 107, an alarming unit 108, and a printing unit 109. The control and monitoring system 100 is arranged to monitor the operating state of a plurality of monitoring targets 101. However, for simplification, only a single monitoring target 101 is shown in FIG. 1. The signal input unit 102 and the signal output unit 103 are used for communicating signals with the monitoring target 101. The processing unit 104 performs processing and computations by using information received from the monitoring target 101 via the signal input unit 102. The communicating unit 105 performs communication with external devices (not shown). The HMI unit 106 is used to display processing results output by the processing unit 104 and to notify the processing unit 104 of an instruction issued by the system operator. The storage unit 107 is used to store various computer programs and a variety of data. The alarming unit 108 issues a warning to the system operator depending on the operating state (e.g., a malfunction state) of the monitoring target 101. The control and monitoring system 100 receives information (signals) regarding the operating state of the monitoring target 101 via the signal input unit 102 and displays the information on the HMI unit 106. Moreover, the control and monitoring system 100 outputs, when necessary, control signals to the monitoring target 101 via the signal output unit 103.

The processing unit 104 uses the information received from the monitoring target 101 to detect a change in the operating state of the monitoring target 101 and to determine whether the monitoring target 101 has fallen in a malfunction state.

The HMI unit 106 includes a display screen (not shown) and input devices (not shown) such as a mouse and a keyboard. The HMI unit 106 is used to display the information regarding the changes in the operating state of the monitoring target 101 to the system operator. Moreover, the HMI UNIT 106 notifies the processing unit 104 of the various instructions issued by the system operator. The system operator can use the input devices of the HMI unit 106 to issue various instructions such as an instruction to display information on the HMI UNIT 106, an instruction to print information by using the printing unit 109, an instruction to make the alarming unit 108 stop issuing a warning, and an instruction to output control signals to the monitoring target 101.

The storage unit 107 is used to store computer programs that run in the processing unit 104, a variety of setting data, the information received from the monitoring target 101, and the processing results of the processing unit 104.

The communicating unit 105 sends a variety of information retained in the control and monitoring system 100 to another apparatus (not shown) or a higher-level apparatus (not shown) and receives control orders from another apparatus or a higher-level apparatus.

Figure 5:
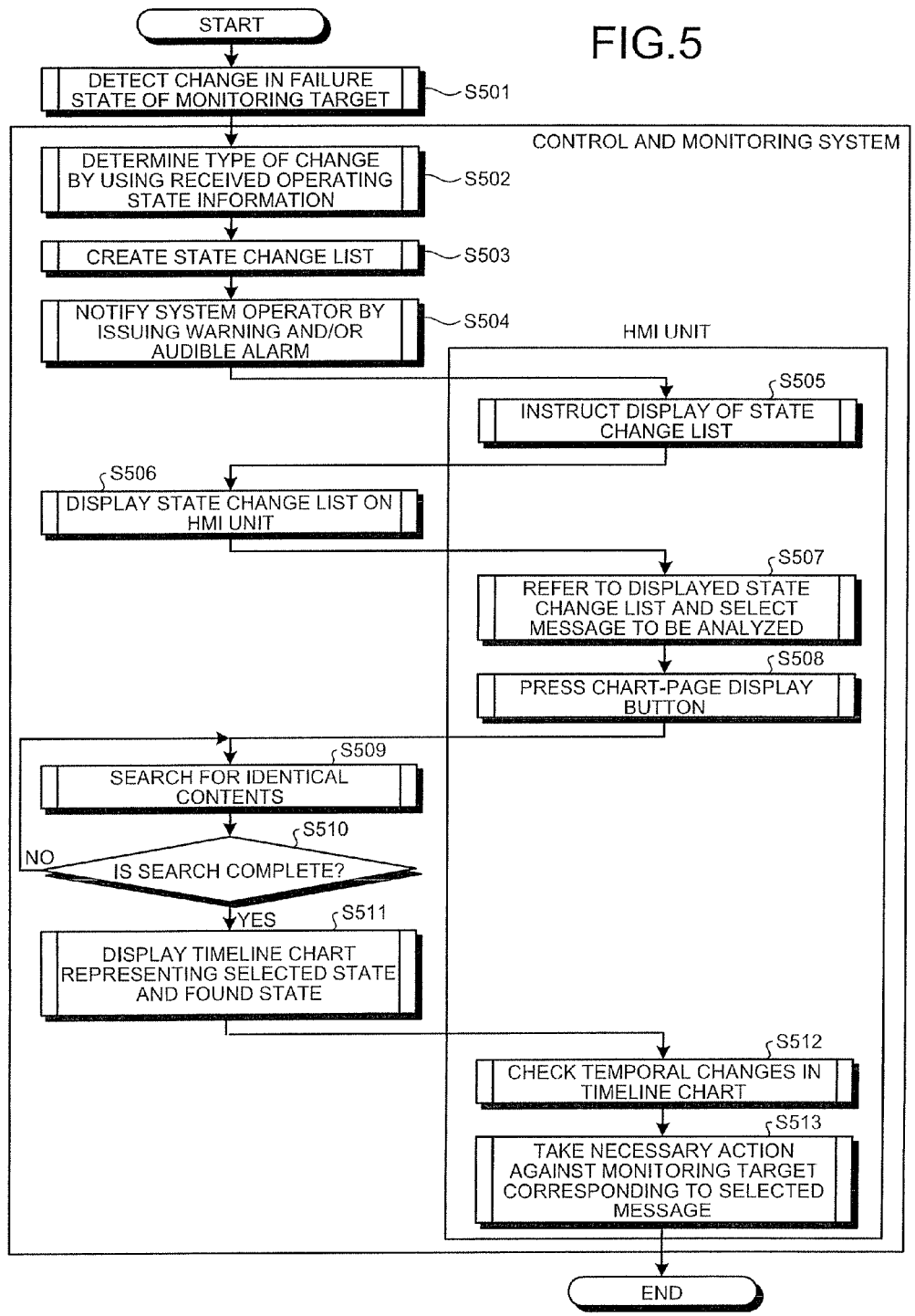
FIG. 5 is a flowchart for explaining an exemplary sequence of operations performed by the control and monitoring system shown in FIG. 1 and by the system operator to display a timeline chart that represents a temporal sequence of changes in the operating state of a particular monitoring target.

Given below is the description with reference to FIGS. 5 and 6 of the operations performed according to the first embodiment. FIG. 5 is a flowchart for explaining the sequence of operations in displaying a timeline chart that represents a temporal sequence of changes in the operating state of a particular monitoring target 101. FIG. 6 is a schematic diagram of a list page that is displayed on the HMI unit 106 and that is used to instruct display of a chart page including a timeline chart.

As shown in FIG. 5, when a change occurs in the operating state of one of the monitoring targets 101 (e.g., when one of the monitoring targets 101 falls in a malfunction state) (Step S501), that monitoring target 101 sends information regarding its current operating state (hereinafter, "current operating state information") to the processing unit 104 via the signal input unit 102 in the form of a binary signal that can have the value "1" or the value "0".

Subsequently, the processing unit 104 compares the current operating state information of the monitoring target 101 with already-stored information regarding the immediate previous operating state of the same monitoring target 101. Based on the comparison result, the processing unit 104 detects a change in the operating state of the monitoring target 101 and uses the value of the received binary signal to determine whether the monitoring target 101 has fallen into a malfunction state (e.g., if the value of the received binary signal is "1") or recovered from a malfunction state (e.g., if the value of the received binary signal is "0") (Step S502).

Subsequently, the processing unit 104 creates a list (hereinafter, "state change list") that includes details of the change detected at Step S502 and details of all previous changes in the operating state of each monitoring target 101 (Step S503). The processing unit 104 stores the state change list in the storage unit 107. If, at Step S502, the monitoring target 101 is determined to have fallen in a malfunction state, the alarming unit 108 issues a warning to the system operator and displays the details of the warning on the HMI unit 106 (Step S504). Meanwhile, the details of the changes can be output to the printing unit 109 for printing or can be sent to an external device by via the communicating unit 105.

Figure 2:
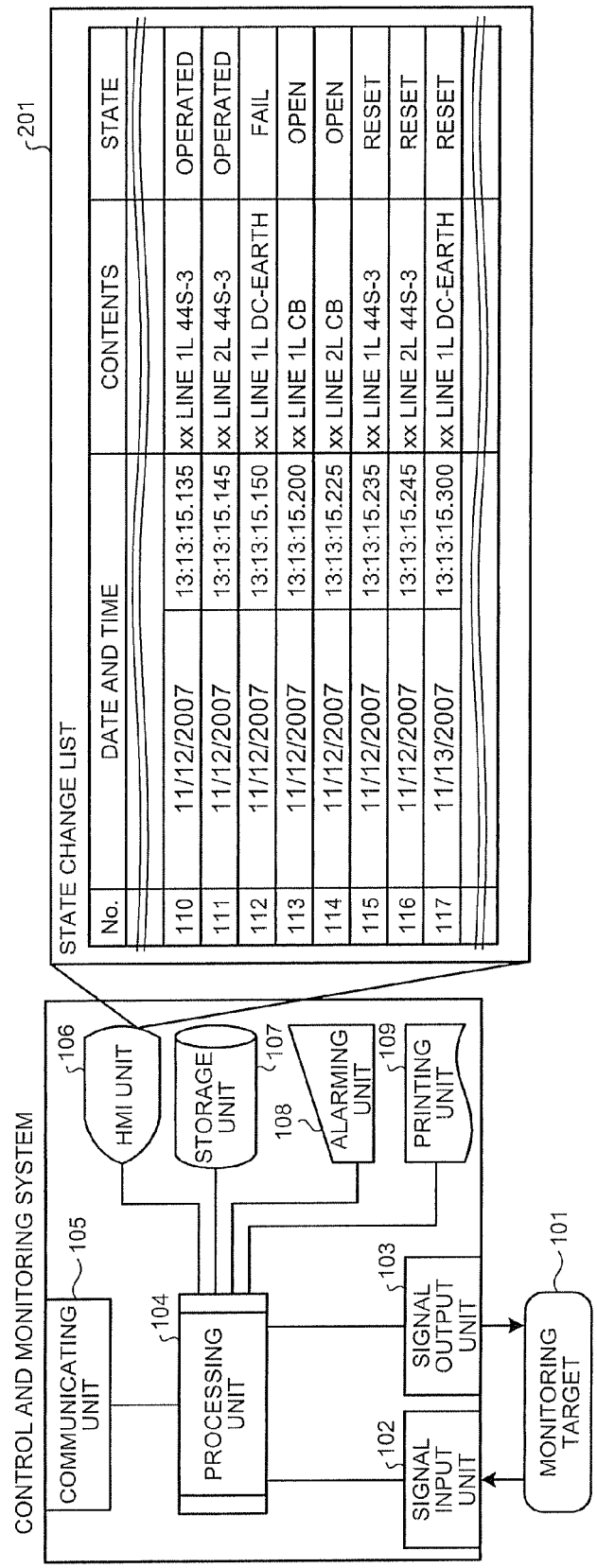
FIG. 2 is a schematic diagram of an exemplary list displayed on an HMI unit shown in FIG. 1.

Upon receiving the warning, the system operator operates the HMI unit 106 and issues an instruction to display the state change list (Step S505). Accordingly, the processing unit obtains the state change list from the storage unit 107 and displays it on the display screen of the HMI unit 106 (Step S506). FIG. 2 is a schematic diagram for explaining an exemplary state change list 201 displayed on the HMI unit 106. As shown in FIG. 2, the state change list 201 is a chronological list of changes in the operating state of a plurality of monitoring targets 101. In the state change list 201, with respect to each message (i.e., detailed information about a change) corresponding to a unique list number in the column of "No.", information regarding the date and the time instant of occurrence of a change, the contents related to the change, and the state after the change is given.

The system operator can refer to the state change list 201 and select a message that needs to be further analyzed (Step S507). For example, assume that, as shown in FIG. 6, the system operator selects a message corresponding to a list number 110, indicated by the position of a mouse cursor 208, from a column 202 of list numbers according to which the messages are chronically listed. The selected message is then displayed in a different color for confirmation. The selected message includes information about the date (date information 203) and the time instant (time information 204 about hour, minute, second, and millisecond) of occurrence of a change, contents 205 related to the change, and the state indicating a working state 206. The contents 205 include identification information of one of the monitoring targets 101.

Upon selecting the message corresponding to the list number 110, the system operator presses a "chart-page display" button 209 (Step S508). Consequently, the processing unit 104 searches the state change list 201 for a message that includes contents identical to the contents 205 in the selected message (Step S509) and repeats Step S509 until all messages including contents identical to the contents 205 are found (Step S510) in a short time and surely compared with a manual operation. Subsequently, the processing unit 104 displays a chart page, which includes a timeline chart representing the change specified in the selected message and the changes specified in the messages found at Step S510, on the display screen of the HMI unit 106 (Step S511).

Thus, the timeline chart represents the temporal sequence of changes in the operating state (signal) of the monitoring target 101 that is identified to be "xx line 1L 44S-3" by the contents 205 in the selected message. The system operator can check the temporal sequence of changes by referring to the timeline chart (Step S512) and accordingly input an instruction from the HMI UNIT 106 about a necessary action to be taken against the monitoring target 101 identified to be "xx line 1L 44S-3" (Step S513). According to the instruction, the processing unit 104 sends control signals to the monitoring target 101 identified to be "xx line 1L 44S-3". In this way, by referring to the timeline chart, the system operator can learn about the temporal sequence in which changes occurred in the operating state of the monitoring target 101 identified in the selected message. That enables the system operator to issue a suitable instruction (e.g., operation termination instruction) by using the HMI UNIT 106. The processing unit 104 then checks for necessary conditions such as interlock conditions and sends the instruction issued by the system operator to the monitoring target 101 via the signal output unit 103.

Figure 7:
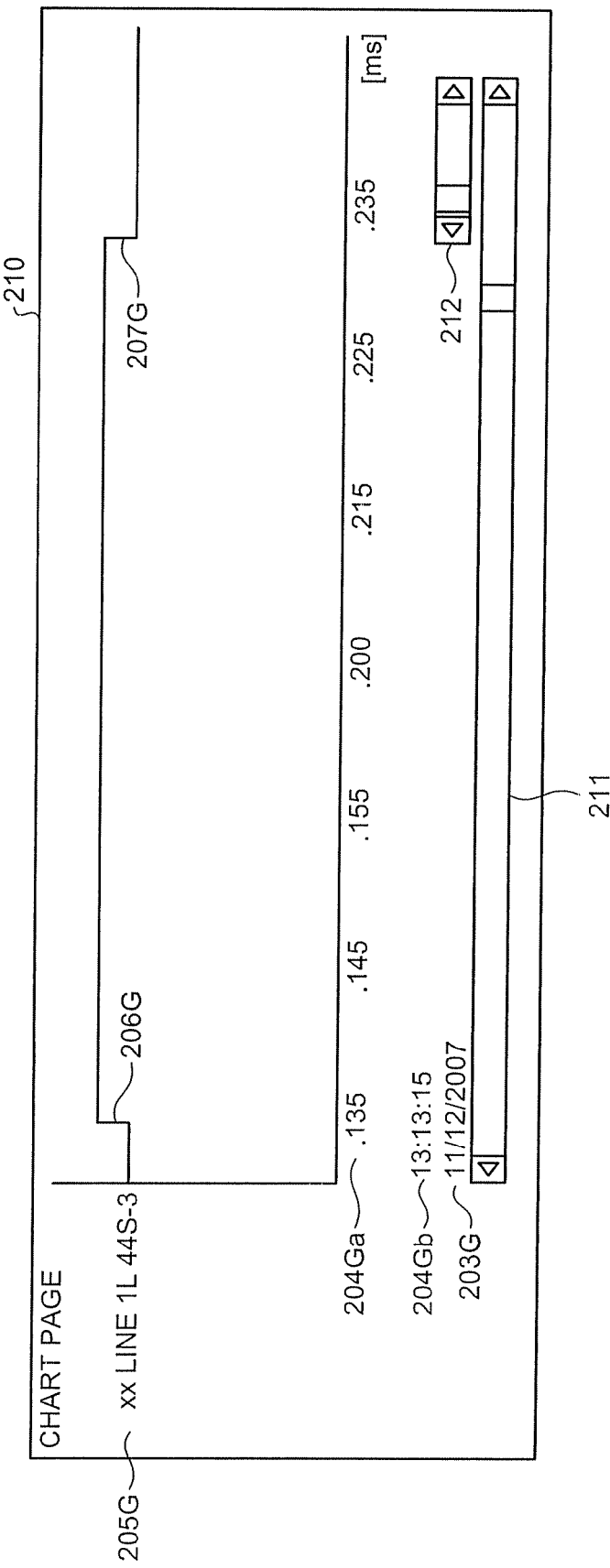
FIG. 7 is a schematic diagram of an exemplary chart page generated by the control and monitoring system shown in FIG. 1.

FIG. 7 is a schematic diagram of an exemplary chart page 210 generated by the control and monitoring system 100 when, as shown in FIG. 6, the system operator selects the message corresponding to the list number 110 and then presses the "chart-page display" button 209. The chart page 210 includes a timeline chart representing the temporal sequence of changes in the operating state of the monitoring target 101 that is identified to be "xx line 1L 44S-3" by contents 205G (equivalent to the contents 205 in FIG. 6) in the selected message. With respect to the monitoring target 101 identified to be "xx line 1L 44S-3", a working state 206G (equivalent to the working state 206 in FIG. 6) of the selected message and a recovered state 207G (equivalent to a recovered state 207 in FIG. 6) of a message corresponding to a list number 115 are depicted at the respective time instants of occurrence. In this way, the chart page 210 includes a timeline graph that represents the temporal sequence of changes in the operating state of the monitoring target 101 selected by the system operator. In the chart page 210, the horizontal axis represents a time axis and the vertical axis represents a signal axis indicating the operating states of the selected monitoring target 101.

The chart page 210 includes a date axis 203G that indicates the date of occurrence of changes, a time axis 204Gb that indicates the time instants in hour, minute, and second of occurrence of changes, and a time axis 204Ga that indicates the time instants in millisecond (msec) of occurrence of changes. Because the time instants of occurrence of changes are given on the millisecond time scale, only the time axis 204Ga is displayed as the coordinate display having a fixed display range. Regarding the date axis 203G and the time axis 204Gb, only the date and the time instant corresponding to the starting point (leftmost point) of the display range of the time axis 204Ga are indicated. As a result, the readability of the chart page 210 is enhanced thereby enabling the system operator to learn about the temporal sequence of changes in the operating state in one glance.

In the initial display of the chart page 210 (i.e., when a scrollbar (described later) is not used to change the default display range), the date and the time instant specified in the selected message are displayed at the leftmost position of the time axis 204Ga. That is, the change in the operating state specified in the selected message is considered as the starting point of the display range of the time axis 204Ga and the subsequent changes in the operating state are displayed on the right side of the starting point. Instead, it is possible to configure the chart page 210 in such a way that the date and the time instant specified in the selected message is displayed in the center or at the rightmost position (end position) of the coordinate display. For example, if the date and the time instant specified in the selected message are displayed at the rightmost position, then the changes prior to the change in the selected message are displayed on the left side of the rightmost position. Similarly, if the date and the time instant specified in the selected message are displayed at the center, then the changes prior to the change in the selected message are displayed on the left side of the center and the changes subsequent to the change in the selected message are displayed on the right side of the center. That enables the system operator to easily check the trend of the temporal sequence of changes.

In the chart page 210, a first scrollbar 211 appears automatically when the range of display time is too long to entirely fit in the display screen. By using the first scrollbar 211, the system operator can scroll the display screen horizontally and see the desired changes in the operating state. If the scroll area itself is too large, then a second scrollbar 212 can be used to vary the display magnification (zoom in or zoom out) of the time axis 204Ga. That enhances the readability of the chart page 210.

In this way, by referring to the chart page 210, the system operator can learn about the trend of the temporal sequence of changes in one glance before going through the plurality of messages listed in the state change list 201.

Figure 3:
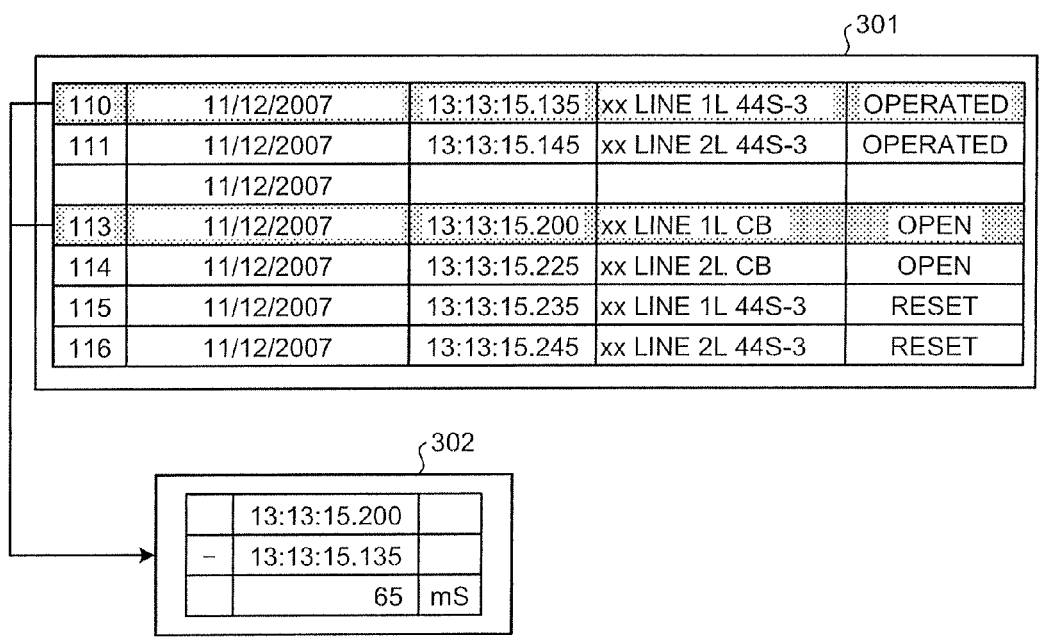
FIG. 3 is a schematic diagram for explaining an exemplary method of message analysis by using a list in a conventional control and monitoring system.
Figure 4:
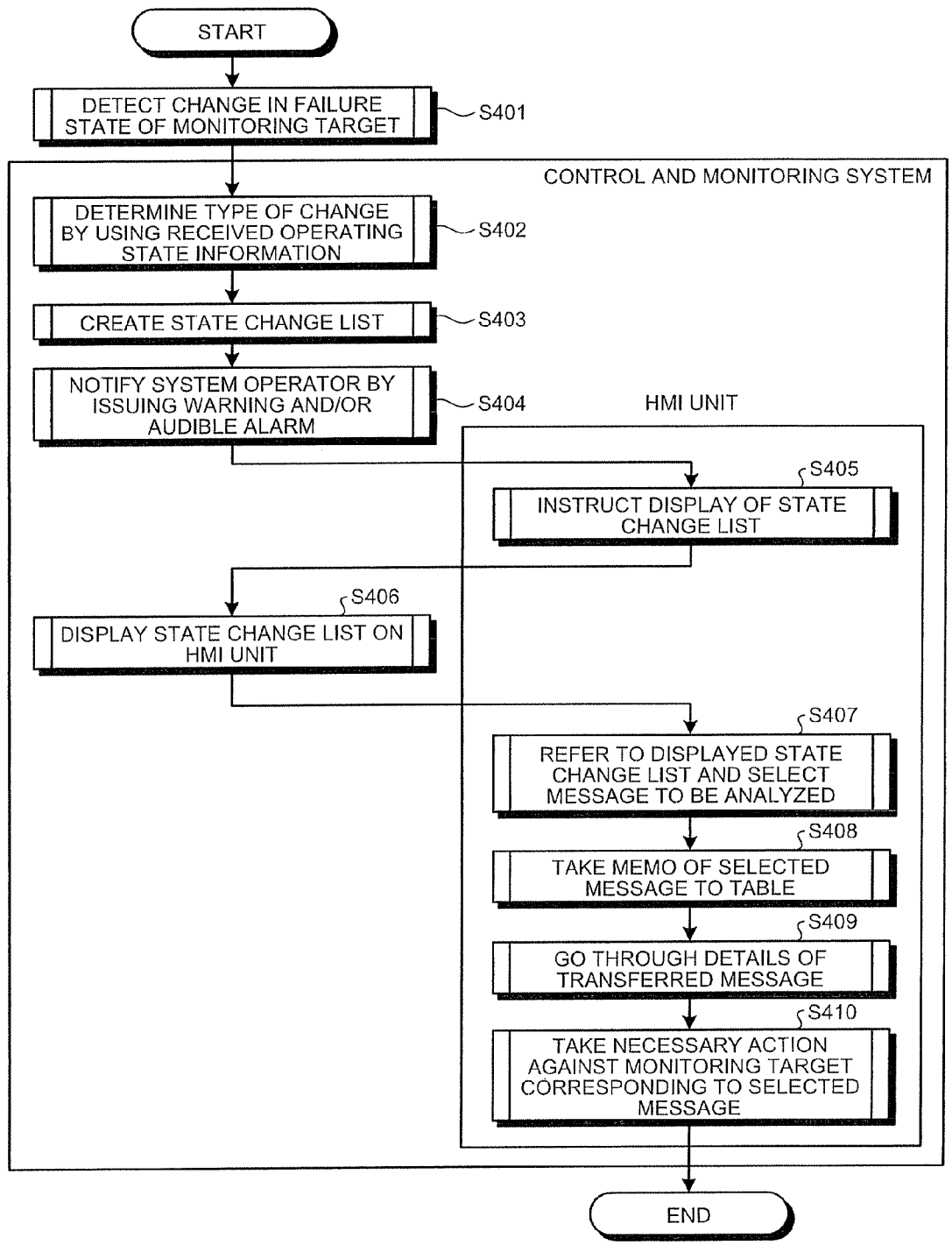
FIG. 4 is a flowchart for explaining an exemplary sequence of operations performed by a conventional control and monitoring system and by the system operator when a change occurs in the operating state of a particular monitoring target.

Given below is the description with reference to FIGS. 3 and 4 of problems faced in a conventional control and monitoring system. FIG. 3 is a schematic diagram for explaining the tasks that the system operator needs to perform by using a state change list. FIG. 4 is a flowchart for explaining the sequence of operations when a change occurs in the operating state of a particular monitoring target and the sequence of tasks to be performed by the system operator.

In the flowchart shown in FIG. 4, Steps S401 to S407 are identical to Steps S501 to S507 in the flowchart shown in FIG. 5. Hence, that description is not repeated for clarity. The system operator refers to the state change list and selects a message that needs to be further analyzed (Step S407) and transfers the selected message to a table (Step S408). Then, the system operator refers to the transferred message to obtain details of the change in the operating state (Step S409) and accordingly takes necessary action against the corresponding monitoring target (Step S410).

For example, the system operator creates a table 301 shown in FIG. 3 and transfers messages selected from the state change list to the table 301. The reason for creating the table 301 is to select only those messages that need to be analyzed at that point of time from among a variety of messages in the state change list. The system operator's experience serves the purpose of selecting particular messages from among a variety of messages in the state change list. In the example shown in FIG. 3, the system operator selects six messages from the state change list and transfers the selected messages to the table 301. Moreover, the system operator uses a table 302 to manually perform temporal subtraction of time instants mentioned in any two messages in the table 301.

In this way, conventionally, the system operator needs to manually recognize the character strings and search for the desired messages from the state change list. Such a task consumes a lot of time and leaves open the possibility that relevant messages are overlooked during the search or a character string is falsely recognized as a similar but different character string.

On the contrary, the use of the control and monitoring system 100 according to the first embodiment eliminates such problems. That is, the control and monitoring system 100 displays the monitoring results of the monitoring targets 101 as the state change list 201 on the HMI unit 106. The state change list 201 includes the details of monitoring results with respect to each monitoring target 101 in the form of character strings or textual messages. Thus, the system operator is able to select a message from the state change list 201 by using an input device such as a mouse. Subsequently, the processing unit 104 searches the state change list 201 for messages that have contents identical to the contents of the selected message and displays a chart page, which includes a timeline chart representing the change specified in the selected message and the changes specified in the found messages, on the HMI unit 106. In this way, the timeline chart can be obtained only for a particular monitoring target 101 that needs to be analyzed. As a result, the time instant of occurrence of the change specified in the selected message and the operating state prior to as well as subsequent to the occurrence of the change specified in the selected message can be easily confirmed in one glance. That enhances the readability of the history of changes in the operating state of a particular monitoring target 101 and enables the system operator to understand the details in a correct manner. Hence, it becomes possible for the system operator to take prompt action against a malfunction state and minimize the adverse effect on other equipments.

Moreover, when the system operator selects a message from the state change list 201, the processing unit 104 identifies the monitoring target 101 from the contents mentioned in the selected message and automatically searches for all other messages that correspond to the same monitoring target 101. Thus, the system operator is relieved of the task of selecting messages. That helps in reducing the maintenance time and reducing the possibility of errors in manual operations.

In the first embodiment, the description is given for the case when the system operator selects a single message corresponding to a single monitoring target 101 from the state change list 201. According to a second embodiment of the present invention described below, the system operator simultaneously selects a plurality of messages from the state change list 201.

FIG. 8 is a schematic diagram of a list page that is displayed on the HMI unit 106 and that includes the state change list 201. According to the second embodiment, the system operator simultaneously selects six messages corresponding to list numbers 110, 111, 113, 114, 115, and 116, indicated by the positions of mouse cursors 208a and 208n. Subsequently, the system operator presses the "chart-page display" button 209 to instruct display of the chart page 210.

Figure 9:
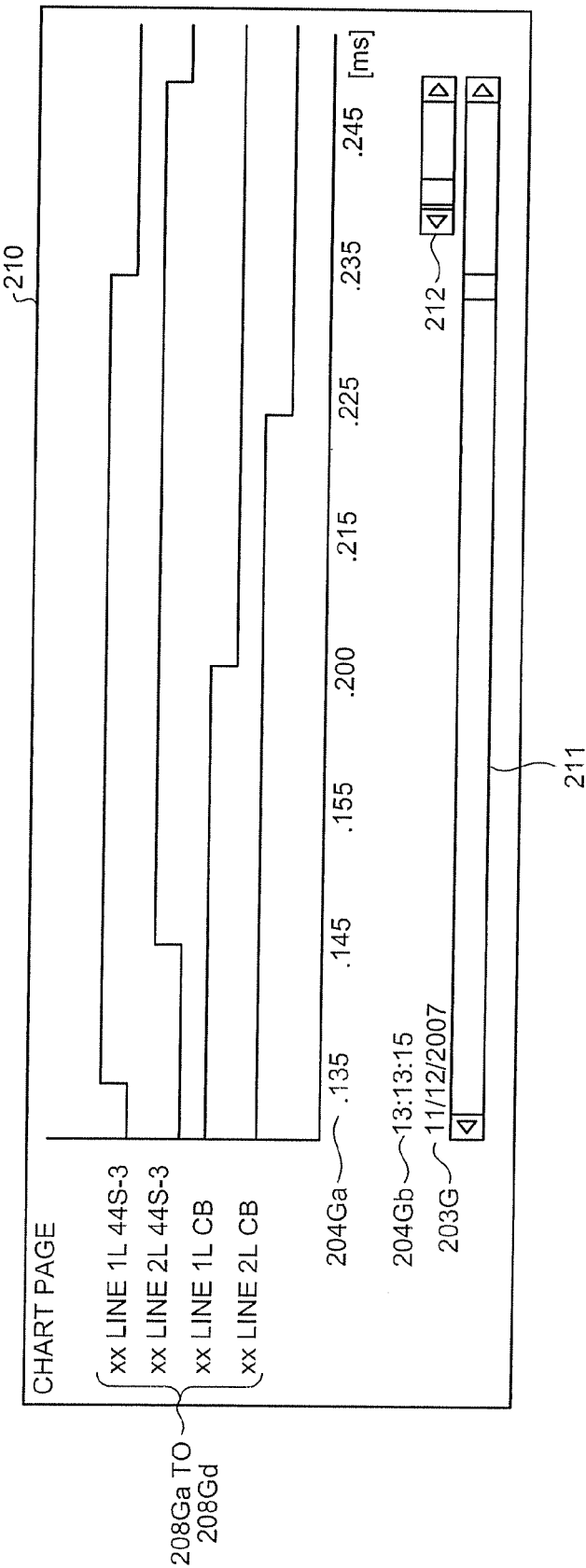
FIG. 9 is a schematic diagram of an exemplary chart page generated by the control and monitoring system according to the second embodiment.

FIG. 9 is a schematic diagram of the chart page 210 generated by the control and monitoring system 100 when, as shown in FIG. 8, the system operator selects the six messages and then presses the "chart-page display" button 209. The chart page 210 includes four timeline charts representing the temporal sequence of changes in the operating state of the monitoring targets 101 identified to be "xx line 1L 44S-3", "xx line 2L 44S-3", "xx line 1L CB", and "xx line 2L CB" by contents 208Ga to 208Gd, respectively. In the chart page 210 shown in FIG. 9, the earliest time instant of occurrence of a change in the operating state of each of the identified monitoring targets 101 is displayed at the leftmost position on the time axis 204Ga. The date axis 203G and the time axis 204Gb can be set in an identical manner as described in the first embodiment.

Displaying the chart page 210 on the HMI unit 106 enables the system operator to learn about the temporal sequence of changes in the operating state of more than one monitoring target 101 in one glance. Meanwhile, in the second embodiment, the description of configuration/operations identical to that described in the first embodiment is not repeated for clarity.

In this way, according to an aspect of the present invention, a history of changes in the operating state of one or more monitoring targets is listed in the form of messages in a state change list and the state change list is displayed on an HMI unit. When the system operator selects a particular message from the state change list, a timeline chart is displayed that represents changes in the operating state of the monitoring target identified in the selected message. That is, the timeline chart can be obtained only for a particular monitoring target that needs to be analyzed. As a result, the time instant of occurrence of the change specified in the selected message and the operating state prior to as well as subsequent to the occurrence of the change specified in the selected message can be easily confirmed in one glance. That enhances the readability of the history of changes in the operating state of a particular monitoring target and enables the system operator to understand the details in a correct manner. Hence, it becomes possible for the system operator to take prompt action against a malfunction state and minimize the adverse effect on other equipments.

Moreover, when the system operator selects a message from the state change list, a monitoring target is identified from the contents mentioned in the selected message and all other messages that correspond to the same monitoring target are automatically searched. Thus, the system operator is relieved of the task of selecting messages. That helps in reducing the maintenance time and reducing the possibility of errors in manual operations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control and monitoring system, comprising:
a processing unit that obtains an operating state signal from at least one monitoring target, detects a change in operating state of the monitoring target based on the operating state signal, creates a state change list in which the change in operating state of the monitoring target is listed in form of a text message including at least one of identification information for identifying the monitoring target and date-time information about date and time at which the change in operating state occurred in the monitoring target, as well as operating state information, and outputs a control signal to the monitoring target according to detected change in operating state; and
a human machine interface unit that includes an operation facility and a display unit that displays thereon the state change list, wherein
when a message is selected from the state change list displayed on the display unit, the processing unit searches the state change list for a message that includes identification information included in the selected message, and displays a chart page that includes a timeline chart representing a temporal sequence of changes in operating state of the monitoring target identified in the selected message based on the selected message and searched message, wherein
the selected message includes a plurality of messages selected from the state change list displayed on the display unit, and
the processing unit displays a chart page that includes a plurality of timeline charts representing temporal sequences of changes in operating state of a plurality of monitoring targets identified in the selected messages, respectively.

2. The control and monitoring system according to claim 1, wherein the processing unit sets, from among pieces of date-time information corresponding to the selected message, earliest date and time at one of first end, second end, and center of a time axis in the chart page.

3. The control and monitoring system according to claim 2, wherein the chart page includes a first scrollbar for changing a range of display time.

4. The control and monitoring system according to claim 3, wherein the chart page includes a second scrollbar for changing display magnification of the time axis.

5. The control and monitoring system according to claim 1, wherein the chart page includes a first scrollbar for changing a range of display time.

6. The control and monitoring system according to claim 5, wherein the chart page includes a second scrollbar for changing display magnification of the time axis.

7. A control and monitoring system, comprising:
a processing unit that obtains an operating state signal from at least one monitoring target, detects a change in operating state of the monitoring target based on the operating state signal, creates a state change list in which the change in operating state of the monitoring target is listed in form of a text message including at least one of identification information for identifying the monitoring target and date-time information about date and time at which the change in operating state occurred in the monitoring target, as well as operating state information, and outputs a control signal to the monitoring target according to detected change in operating state; and a human machine interface unit that includes an operation facility and a display unit that displays thereon the state change list, wherein when a message is selected from the state change list displayed on the display unit, the processing unit searches the state change list for a message that includes identification information included in the selected message, and displays a chart page that includes a timeline chart representing a temporal sequence of changes in operating state of the monitoring target identified in the selected message based on the selected message and searched message, wherein the processing unit sets, from among pieces of date-time information corresponding to the selected message, earliest date and time at one of first end, second end, and center of a time axis in the chart page.

8. The control and monitoring system according to claim 7, wherein the chart page includes a first scrollbar for changing a range of display time.

9. The control and monitoring system according to claim 8, wherein the chart page includes a second scrollbar for changing display magnification of the time axis.

10. A control and monitoring system, comprising:

a processing unit that obtains an operating state signal from at least one monitoring target, detects a change in operating state of the monitoring target based on the operating state signal, creates a state change list in which the change in operating state of the monitoring target is listed in form of a text message including at least one of identification information for identifying the monitoring target and date-time information about date and time at which the change in operating state occurred in the monitoring target, as well as operating state information, and outputs a control signal to the monitoring target according to detected change in operating state; and a human machine interface unit that includes an operation facility and a display unit that displays thereon the state change list, wherein when a message is selected from the state change list displayed on the display unit, the processing unit searches the state change list for a message that includes identification information included in the selected message, and displays a chart page that includes a timeline chart representing a temporal sequence of changes in operating state of the monitoring target identified in the selected message based on the selected message and searched message, wherein the chart page includes a first scrollbar for changing a range of display time.

11. The control and monitoring system according to claim 10, wherein the chart page includes a second scrollbar for changing display magnification of the time axis.

* * * * *